Feb. 6, 1923.

A. J. KARL ET AL 1,444,613

POWER TRANSMISSION DEVICE

Filed June 29, 1921

2 sheets-sheet 1

INVENTOR.
A. J. Karl and B. F. Webb
BY
Geo. P. Kimmel
ATTORNEY.

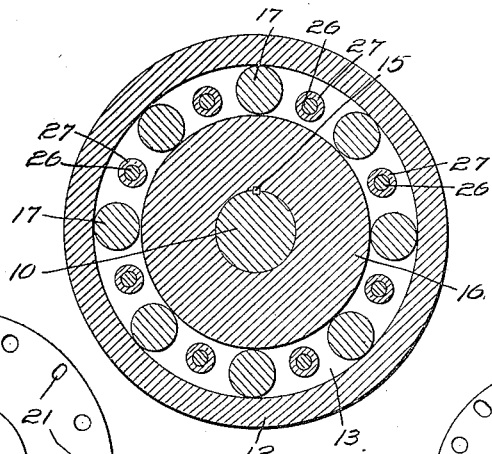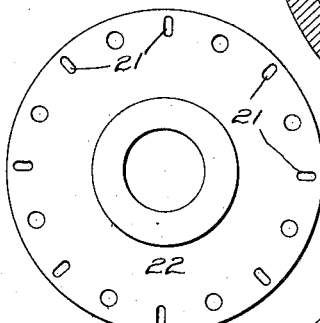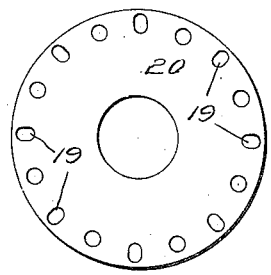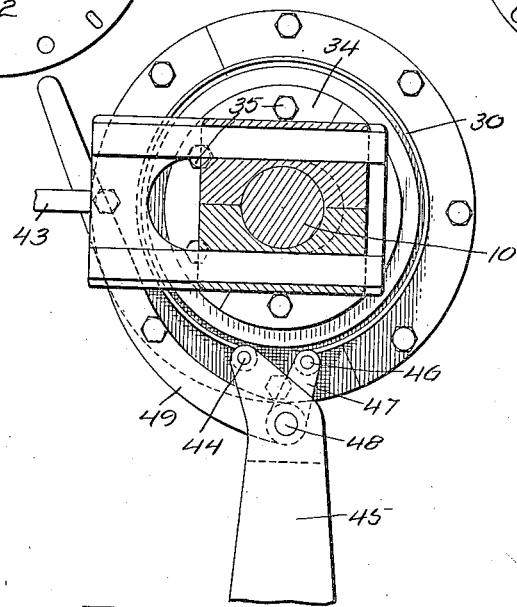

Patented Feb. 6, 1923.

1,444,613

UNITED STATES PATENT OFFICE.

ANDREW J. KARL AND BENJAMIN F. WEBB, OF SISTERSVILLE, WEST VIRGINIA.

POWER-TRANSMISSION DEVICE.

Application filed June 29, 1921. Serial No. 481,336.

*To all whom it may concern:*

Be it known that we, ANDREW J. KARL and BENJAMIN F. WEBB, citizens of the United States, residing at Sistersville, in the county of Tyler and State of West Virginia, have invented certain new and useful Improvements in Power-Transmission Devices, of which the following is a specification.

This invention appertains to certain improvements in power transmission devices or mechanisms, and more particularly to a type of the same adapted for general use in connection with all forms of power driven mechanisms and machines, including motor driven vehicles.

The principal object of the invention is to provide for a device or mechanism of the class mentioned, and one of an extremely simplified and comparatively inexpensive construction and arrangement of parts capable of functioning efficiently for the transmission of power from a driving part to a driven part with a gradual pick up in speed of the driven part without the usual sudden and otherwise jerking motions thereof.

Another object of the invention is to provide for a device or mechanism of the character set forth, and one embodying a refined mechanical construction and arrangement of the parts, whereby to function as a friction clutch for the full forward drive of a driven part in its position of operation when running under full free power from the motive agents, and as a means for reversing the direction of rotation of the driven parts when subjected to a braking action, the driving part thereof maintaining continuously in one direction of rotation in both of the forward and reverse movements of the driven part or parts.

A further object of the invention is to provide for a device or mechanism as characterized, and one embodying the features of construction and operation as hereinbefore noted, and which, in addition thereto, is capable of manipulation whereby to effect a comparatively wide variation in the speed of the rotation of the driven part.

With the foregoing and other objects in view, the invention resides in the certain novel and useful construction and arrangement of parts, as will be hereinafter more fully described, set forth in the appended claims, and illustrated in the accompanying drawings, in which:—

Figure 1:
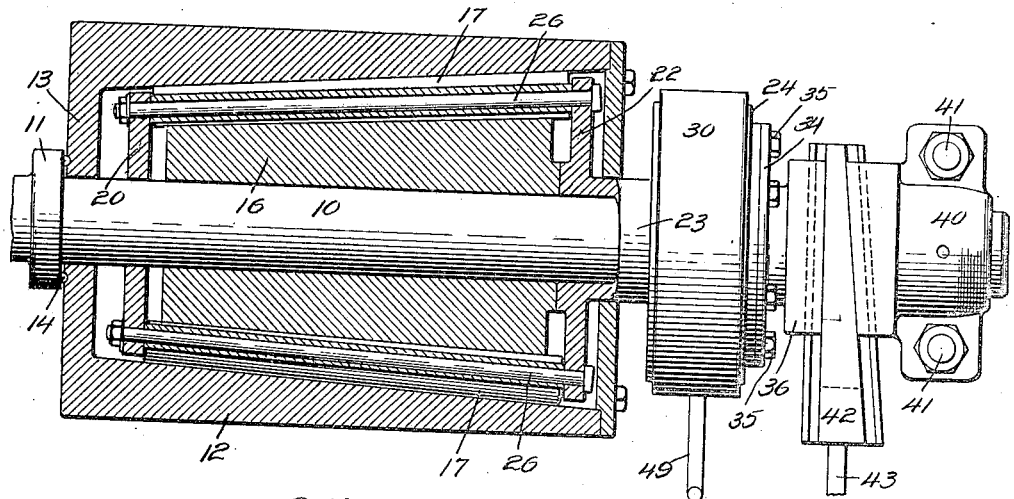
Figure 2:
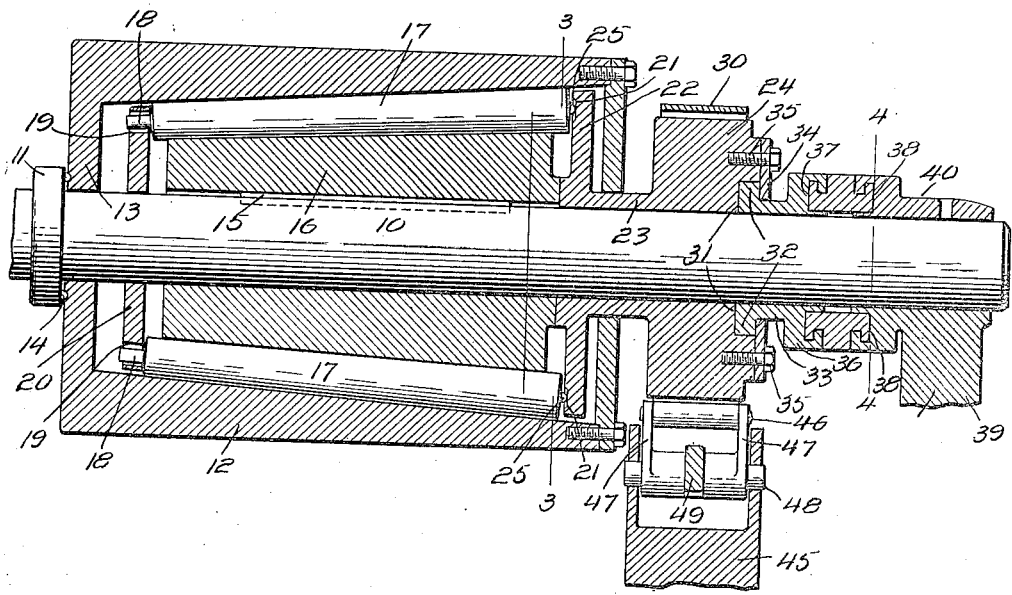

Figure 1 is a top plan view of the power shaft and the operating means for the power transmission device, the latter being shown in section, together with the driven element thereof, Fig. 2 is a vertical longitudinal section, Fig. 3 is a vertical transverse section taken on the line 3—3 of Fig. 2, Fig. 4 is a vertical transverse section taken on the line 4—4 of Fig. 2, Fig. 5 is an elevation of the flanged end of the brake drum device, and, Fig. 6 is an elevation of the disk or plate cooperative with the flanged end of the brake drum for supporting the roller bearings in position.

Referring to the drawing, wherein similar characters of reference designate corresponding parts in the several views thereof, the preferred embodiment of the invention as shown therein, comprises a power or driving shaft section 10 having a fixed or integrally formed collar 11 at one point thereof, and a loosely mounted power transmitting element 12, such as a hub, pulley or the like, disposed at one side of the collar 11. This power element is preferably cylindrical in form, and is provided with a tapered bore having its smaller end closed by an end wall 13 in the outer face of which is formed an annular raceway arranged in registry with a similar raceway formed in the opposed face of the collar 11, and in which is seated a set of ball bearings 14.

Splined on the power shaft 10, as at 15, and positioned thereon for sliding movement within the confines of the tapered bore of the power element 12, is a clutch member or cone 16, which is tapered correspondingly with respect to the bore of the power element 12, and of a length substantially less than the depth of said tapered bore thereof. The clutch member or cone 16 is inclosed within a cage formed by means of a circular series of equidistantly spaced friction rollers 17, each tapered correspondingly with respect to the taper of the power element 12, and of the clutch member or cone 16, and are of a greater length than the latter. The inner ends of these friction rollers 17 are of a reduced diameter to provide spindle portions 18 supported in radially elongated slots 19 formed in an annular disk or plate 20, which is carried on the shaft 10, while the forward or outer ends thereof have flat end faces formed with concentrically disposed semispherical depressions or recesses which are cooperative with complementally arranged depressions or recesses 21, formed in the opposed face of an annular flange 22 which, in turn, is formed at the inner end of a hub extension 23 of a brake drum or cylinder 24, the latter being slidably mounted on the shaft 10. Seated in each of the complemental pairs of the depressions or recesses of the rollers and flange 22, is a ball bearing 25, and the depressions or recesses 21 are elongated in directions radially of the flange 22, and correspondingly with the elongations of the slots 19 of the disk or plate 20, for the purpose as will be hereinafter more fully explained. After the rollers 17 have been positioned between the disk or plate 20 and the flange 22, the latter are connected together by means of suitable bolts or the like 26 which are passed through suitable spacing sleeves 27 interposed between the disk or plate 20 and the flange 22 for the purpose of preventing the binding of the rollers 17 against desired rotation. The open end of the bore of the power element 12 is closed, after the clutch member or cone 16, the rollers 17, and the disk or plate 20, together with the flange 22, have been assembled therein, by means of a two-part closure plate 28 being secured in position by means of screws or the like 29 being threaded into suitably formed openings in the end edge of the power element 12, the parts of the same being split on a central line and formed with registering semi-circular openings arranged in straddling relation over the hub portion 23 of the brake drum 24.

The brake drum 24 has associated with the same a brake band 30, and has its outer end face formed to provide a circular recess 31 disposed concentrically thereof for the reception of the flanged end 32, of an operating member 33, which flanged end is of a diameter to snugly fit the recess 31, and, when seated therein, has its outer face portion disposed flush in the plane of the complemental face of the drum 24. The member 33 is held in position by means of a diametrically split plate 34 being secured on the outer face of the drum 24 by means of screws or the like 35. The outer end of the member 33 is formed with an enlarged head portion 36, which has its outer face formed to provide a pair of vertically spaced horizontally extending slotways 37, which are complemental to a similar pair of slotways 38 formed in the opposed face of a bearing member which is formed to provide a lower fixed part 39 and an upper removable part 40, the latter being normally secured in position on the lower portion 39 by means of screws or the like 41.

Engaged on the shaft 10 and interposed between the member 33 and the bearing parts 39 and 40, is an actuating member or yoke 42, which is slidable transversely on the shaft 10 by means of an operating rod 43, and is formed to provide pairs of angularly disposed guide ribs or beads 44 arranged in sliding engagement with the complemental pairs of slotways 37 and 38 of the enlarged portion 36, of the member 33, and the parts 39 and 40 of the bearing. The outer face of the enlarged portion of the member 33 is flat, while the faces of the parts 39 and 40, of the bearing, opposed thereto are beveled, substantially as is shown, and the actuating member or yoke 42 is of a wedge shape corresponding to the space formed between the opposed faces of the member 33 and the parts of the bearing. For manipulating the actuating member or yoke 42, the operating rod 43, is provided, and connects the member or yoke 42 at its widest end for the purpose.

In the operation of the device, with the parts of the same in inoperative position, as with the main friction roller or cone 16 moved to a position out of contact with the friction rollers 17, by the wedge shaped actuating member 42 being pulled outwardly to its full limit from between the oposed slotted portion 36 of the bearing portions 39 and 40, and with power applied to the shaft 10, the latter will rotate freely without the power thereof being transmitted to the power element 12. For effecting a forward drive of the power element 12, the actuating member 42 is manipulated in an inward direction and acts to force the main roller or cone 16 into frictional engagement with the rollers 17, which are in frictional contact with the wall of the tapered bore of the power element 12 at all times, when the latter will be driven in the forward direction correspondingly with the direction of rotation of the shaft 10. By reason of the frictional engagement of the parts, the load on the power element or pulley 12 will be speeded up gradually and without any appreciable jolts or jars, and correspondingly with the gradual tightening of the grip between the main roller 16 and the frictional rollers 17, and, when the main roller or cone has been forced to its fully engaged position, maximum power will be transmitted to the power element 12 from the shaft 10. In this instance, the friction rollers 17 are locked or wedged between the main roller or cone 16 and the power element 12, since the cage carrying the same freely rotates with the main roller or cone 16. To effect a reversed drive of the power driven element 12, the brake band 30, normally trained around the drum 24, is tightened on the latter, and acts to retain the friction roller cage stationary, when the rollers 17 will be free to be driven by the main roller or cone 16 in a direction reversed thereto and consequently to the direction of rotation of the shaft 10, and will correspondingly drive the power element 12, in such reverse direction. This reverse direction of rotation of the power element 12 is maintained at practically the same maximum speed as in the forward drive of the same, and as long as the brake band 30 is kept in tightened condition. For manipulating the brake band 30, one end of the same is secured, as at 44, to a part or standard 45, and the opposite end thereof is secured, as at 46, to the short arm 47 of an operating lever 48, which is pivoted, as at 49, in proper position on the part or standard 45 for the purpose. By manipulating the actuating member or wedge 42 in a manner to increase or decrease the frictional contact to the roller 17, with the cone 16 and the bore of the power element 12, the speed of the latter may be varied throughout a comparatively wide range.

From the foregoing, it will be readily apparent that the general construction and arrangement of the parts of the invention are extremely simplified and comparatively inexpensive to manufacture, and in the use of the same, in lieu of the present forms of power transmission devices or mechanisms, the device or mechanism as a whole will function effectively for the desired and intended purposes, and will otherwise possess marked advantages in the point of simplicity, durability, and general efficiency.

It is well understood that, while a preferred embodiment of the device or mechanism has been described and illustrated herein in specific terms and details of construction, arrangement and assembly of parts, various changes in and modifications of the same may be resorted to without departing from the spirit of the invention or scope of the claims appended hereto.

Having thus fully described the invention, what is claimed, is:—

1. The combination with a driving part, of a driven part loosely mounted on said driving part, a friction clutch means for operatively connecting the driven part to the driving part for the rotation thereof in the same direction, friction rollers interposed between said clutch means and the driven part and normally bodily movable therewith, and means for effecting a braking action on said friction rollers whereby to cause the same to drive the driven part in a reverse direction.

2. In power transmission device, a drive shaft, a driven element loosely mounted on said drive shaft, a clutch means operable for connecting and disconnecting said driven element to and from said drive shaft, friction rollers interposed between said clutch means and said driven element, means carried on said drive shaft for supporting said friction rollers in position, and a brake means operable for retaining said last mentioned means stationary whereby to admit of the friction rollers being driven by said clutch means whereby to effect a reverse direction of operation of said driven element.

3. In a power transmission device, a drive shaft, a pulley, a tapered roller operable for connecting and disconnecting said pulley to and from said driving shaft, friction rollers interposed between tapered roller and said driven element, means carried on said drive shaft for supporting said friction rollers in position, and normally rotatable with tapered roller to cause a corresponding rotative movement of said pulley, and a brake means operable for retaining said last mentioned means stationary whereby to admit of said friction rollers being driven by said tapered roller to effect a reverse direction of rotation of said pulley.

4. In a power transmission device, a drive shaft, a pulley loosely journaled on said drive shaft, a cone clutch element keyed on said drive shaft, and operable for connecting and disconnecting the pulley to and from the same, friction rollers interposed between said cone clutch element and said pulley, means carried on said drive shaft for supporting said friction rollers in position, a brake drum carried by said supporting means, and a brake band carried by said brake drum and operable to retain said supporting means against movement whereby to admit of the driving of said friction rollers in a direction reversed thereto and in a manner to reverse the direction of rotation of said pulley.

5. In a power transmission device, a power shaft, a pulley loosely journaled on said power shaft, a cone clutch element keyed for sliding movement on said power shaft and operable for connecting and disconnecting said pulley to and from the same, a cage enclosing said cone clutch and interposed between the same and said pulley, friction rollers carried by said cage and arranged in frictional engagement with said pulley, means for moving said cone clutch into and out of engagement with said cage for connecting and disconnecting said pulley to and from said drive shaft, and means for braking said cage whereby to admit of said friction rollers being driven by said cone clutch for imparting a reversed direction of rotation to said pulley.

6. In a power transmission device, a power shaft, a pulley loosely journaled on said power shaft and having a concentric bore, a cone clutch element keyed on said power shaft within the bore of said pulley, a cage interposed between said cone clutch and the wall of the bore of said pulley, friction rollers carried by said cage and arranged in frictional engagement with the wall of the bore of said pulley, means for moving said cone clutch element into and out of engagement with said cage for connecting and disconnecting said pulley to and from said power shaft, and means for braking said roller cage whereby to admit of said friction rollers being driven by said cone clutch for imparting a reversed direction of rotation to said pulley.

70. In a power transmission device, a power shaft, a pulley loosely journaled on said power shaft and having an inwardly tapered and concentrically disposed bore, a clutch member keyed on said power shaft within the bore of said pulley and correspondingly tapered with respect thereto, a cage interposed between said cone clutch and the wall of the bore of said pulley, tapered friction rollers carried by said cage and arranged in frictional engagement with the wall of the bore of said pulley, means for moving said cone clutch element into and out of engagement with said cage for connecting and disconnecting said pulley to and from said power shaft, a brake drum carried by said roller cage, a brake band trained around said drum, and means for actuating said brake band to tighten the same on said drum whereby to retain said roller cage against rotation and to admit of said friction rollers being driven by said cone clutch for imparting a reversed direction of rotation to said pulley.

In testimony whereof, we affix our signatures hereto.

ANDREW J. KARL.
BENJAMIN F. WEBB.